(12) United States Patent
Luo

(10) Patent No.: US 11,202,300 B2
(45) Date of Patent: Dec. 14, 2021

(54) METHOD AND SYSTEM FOR ADJUSTING SOUND QUALITY, AND HOST TERMINAL

(71) Applicant: SHENZHEN TCL NEW TECHNOLOGY CO., LTD., Shenzhen (CN)

(72) Inventor: Qinggang Luo, Shenzhen (CN)

(73) Assignee: SHENZHEN TCL NEW TECHNOLOGY CO., LTD., Shenzhen (CN)

( * ) Notice: Subject to any disclaimer, the term of this patent is extended or adjusted under 35 U.S.C. 154(b) by 155 days.

(21) Appl. No.: 16/672,780

(22) Filed: Nov. 4, 2019

(65) Prior Publication Data

US 2020/0068583 A1 Feb. 27, 2020

Related U.S. Application Data

(63) Continuation of application No. PCT/CN2017/111029, filed on Nov. 15, 2017.

(30) Foreign Application Priority Data

Jun. 30, 2017 (CN) .......................... 201710530969.3

(51) Int. Cl.
*H04W 72/08* (2009.01)
*H04B 17/318* (2015.01)
(Continued)

(52) U.S. Cl.
CPC ........... *H04W 72/085* (2013.01); *G10L 19/24* (2013.01); *H04B 17/318* (2015.01);
(Continued)

(58) Field of Classification Search
CPC ... H04W 72/085; H04W 76/10; H04W 8/005; H04B 17/318; G10L 19/24; H04L 43/0888; H04L 69/24
See application file for complete search history.

(56) References Cited

U.S. PATENT DOCUMENTS 9,860,766 B1 * 1/2018 Pawar .................... G10L 19/22
2003/0189900 A1 * 10/2003 Barany ................ H04L 1/0014
370/229

(Continued)

FOREIGN PATENT DOCUMENTS

CN 1816158 A 9/2006
CN 101119338 A * 2/2008
(Continued)

OTHER PUBLICATIONS

Communication pursuant to Rules 70(2) and 70a(2) EPC dated Mar. 18, 2021, for Shenzhen TCL New Technology Co., LTD, European Application No. 17915878.7, filed Nov. 15, 2017.
(Continued)

*Primary Examiner* — Deepa Belur
(74) *Attorney, Agent, or Firm* — Law Offices of Albert Wai-Kit Chan, PLLC

(57) ABSTRACT

The present disclosure provides a method for adjusting sound quality, a system for adjusting sound quality, and a host terminal. The method includes: acquiring a coding rate range of a wireless audio device, in response to a host terminal establishing a wireless communication connection with the wireless audio device; presetting a first coding rate of the host terminal according to the coding rate range and a current signal strength of the wireless communication connection, and controlling the host terminal to transmit audio data to the wireless audio device at the first coding rate; acquiring a throughput during the transmission of the audio data fed back by the wireless audio device, and determining whether the throughput matches a current wireless transmission quality; and adjusting the first coding rate according to a determination result, to adjust the sound quality of the audio data.

20 Claims, 5 Drawing Sheets

(51) Int. Cl.
*H04W 76/10* (2018.01)
*G10L 19/24* (2013.01)
*H04L 12/26* (2006.01)
*H04L 29/06* (2006.01)
*H04W 8/00* (2009.01)

(52) U.S. Cl.
CPC .......... *H04L 43/0888* (2013.01); *H04L 69/24* (2013.01); *H04W 8/005* (2013.01); *H04W 76/10* (2018.02)

(56) References Cited

U.S. PATENT DOCUMENTS

| | | | |
|---|---|---|---|
| 2004/0141572 | A1 | 7/2004 | Marc et al. |
| 2007/0053446 | A1 | 3/2007 | Spilo |
| 2008/0077410 | A1* | 3/2008 | Ojala ............... G10L 19/167 704/500 |
| 2012/0039391 | A1* | 2/2012 | Frusina ............ H04W 28/14 375/240.07 |
| 2012/0307886 | A1* | 12/2012 | Agarwal ............ H04W 4/18 375/240.02 |
| 2013/0137373 | A1* | 5/2013 | Choi ................ H04W 76/14 455/41.1 |
| 2016/0323425 | A1 | 11/2016 | Atarius et al. |
| 2018/0048744 | A1* | 2/2018 | Bhat Noojady Krishna ............... H04L 12/10 |

FOREIGN PATENT DOCUMENTS

| | | |
|---|---|---|
| CN | 101499805 A | 8/2009 |
| CN | 102106112 A | 6/2011 |
| CN | 102131241 A | 7/2011 |
| CN | 102237091 A | 11/2011 |
| CN | 102811367 A | 12/2012 |
| CN | 102986211 A | 3/2013 |
| CN | 103532936 A | 1/2014 |
| CN | 103560862 A | 2/2014 |
| CN | 104320843 A | 1/2015 |
| CN | 104967872 A | 10/2015 |
| CN | 104993849 A | 10/2015 |
| CN | 105846865 A | 8/2016 |
| CN | 106412326 A | 2/2017 |
| CN | 101075180 A | 9/2017 |
| CN | 107170460 A | 9/2017 |
| GB | 2519391 A | 4/2015 |
| JP | 2008061034 A | 3/2008 |
| WO | 03088551 A1 | 10/2003 |
| WO | WO-2005122025 A2 * | 12/2005 ......... H04L 65/4076 |
| WO | 2014194754 A1 | 12/2014 |

OTHER PUBLICATIONS

Chinese Office Action, dated Mar. 30, 2020, for Shenzhen TCL New Technology Co., Ltd., Chinese Application No. 201710530969.3, filed Jun. 30, 2017.

International Search Report, dated Mar. 27, 2018, for Shenzhen TCL New Technology Co., Ltd, International Application No. PCT/CN2017/111029, Filed Nov. 15, 2017.

Written Opinion, dated Mar. 27, 2018, for Shenzhen TCL New Technology Co., Ltd, International Application No. PCT/CN2017/111029, Filed Nov. 15, 2017.

* cited by examiner

METHOD AND SYSTEM FOR ADJUSTING SOUND QUALITY, AND HOST TERMINAL

FIELD

The present disclosure relates to the field of multimedia data transmission, and more particularly relates to a method for adjusting sound quality, a system for adjusting sound quality, and a host terminal.

BACKGROUND

Currently, most of multimedia devices are wirelessly connected to host terminals for easy carrying and moving. However, multimedia data transmitted between the multimedia device and the host terminal is susceptible to distance, electromagnetic interference, and quality of the wireless transmission, such that the multimedia data cannot be played smoothly, which affects playing quality of the multimedia device.

SUMMARY

The present disclosure provides a method for adjusting sound quality, aiming to enable audio data to be played smoothly on multimedia devices.

In one aspect, the present disclosure provides a method for adjusting sound quality, including: acquiring a coding rate range of a wireless audio device, in response to a host terminal establishing a wireless communication connection with the wireless audio device; presetting a first coding rate of the host terminal according to the coding rate range and a current signal strength of the wireless communication connection, and controlling the host terminal to transmit audio data to the wireless audio device at the first coding rate; acquiring a throughput during the transmission of the audio data fed back by the wireless audio device, and determining whether the throughput matches a current wireless transmission quality; and adjusting the first coding rate according to a determination result, to adjust the sound quality of the audio data.

Optionally, the operation of acquiring a coding rate range of a wireless audio device, in response to a host terminal establishing a wireless communication connection with the wireless audio device includes: controlling the host terminal to search for the wireless audio device within an identifiable range after the wireless communication connection of the host terminal is on, and sending a wireless communication protocol; establishing, by the host terminal, a data transmission channel with the wireless audio device, in response to the host terminal receiving an acceptance of the wireless communication protocol fed back by the wireless audio device; and acquiring the coding rate range of the wireless audio device according to hardware information of the wireless audio device.

Optionally, the operation of presetting a first coding rate of the host terminal according to the coding rate range and a current signal strength of the wireless communication connection, and controlling the host terminal to transmit audio data to the wireless audio device at the first coding rate includes: detecting the current signal strength of the wireless communication connection between the host terminal and the wireless audio device; presetting the first coding rate of the host terminal within the coding rate range according to the current signal strength; and controlling the host terminal to transmit the audio data to the wireless audio device at a preset compression rate and the first coding rate.

Optionally, the operation of acquiring a throughput during the transmission of the audio data fed back by the wireless audio device, and determining whether the throughput matches a current wireless transmission quality includes: acquiring an actual throughput during the transmission of the audio data fed back by the wireless audio device, when the host terminal transmits the audio data transmission at the first coding rate; and determining whether the actual throughput matches a theoretical throughput corresponding to the first coding rate, and outputting the determination result.

Optionally, the operation of adjusting the first coding rate according to a determination result, to adjust the sound quality of the audio data includes: controlling the host terminal to continuously transmit the audio data to the wireless audio device at the first coding rate and the preset compression rate, if the actual throughput matches the theoretical throughput; and controlling the host terminal to increase or decrease the first coding rate to obtain an adjusted coding rate, if the actual throughput fails to match the theoretical throughput, and adjusting the sound quality of the audio data with the adjusted coding rate.

Optionally, the operation of controlling the host terminal to increase or decrease the first coding rate to obtain an adjusted coding rate, if the actual throughput fails to match the theoretical throughput, and adjusting the sound quality of the audio data with the adjusted coding rate includes: increasing the coding rate of the host terminal to a second coding rate, if the actual throughput is less than the theoretical throughput, and improving the sound quality of the audio data with the second coding rate; and decreasing the coding rate of the host terminal to a third coding rate, if the actual throughput is greater than the theoretical throughput, and reducing the sound quality of the audio data with the third coding rate.

Optionally, the wireless communication connection includes a Bluetooth connection, a WiFi connection, or a ZigBee connection; the wireless audio device includes a Bluetooth earphone, a Bluetooth speaker, or a mobile phone.

In another aspect, the present disclosure provides a host terminal, including a memory, a processor and a program for adjusting sound quality that is stored in the memory and executable by the processor. The program for adjusting sound quality when being executed by the processor performs the steps of the method for adjusting sound quality as described above.

In still another aspect, the present disclosure provides a system for adjusting sound quality, including a host terminal as described above, and a wireless audio device configured to receive and play audio data transmitted by the host terminal.

In still another aspect, the present disclosure provides a storage medium, storing a program for adjusting sound quality. The program for adjusting sound quality when being executed by a processor performs the steps of the method for adjusting sound quality as described above.

In accordance with the present disclosure, the method for adjusting sound quality is performed based on the quality of the wireless transmission between the host terminal and the wireless audio device. The method includes: acquiring the coding rate range of the wireless audio device, in response to the host terminal establishing the wireless communication connection with the wireless audio device; presetting the first coding rate of the host terminal according to the coding rate range and the current signal strength of the wireless communication connection, and controlling the host terminal to transmit the audio data to the wireless audio device at the first coding rate; acquiring the throughput during the transmission of the audio data fed back by the wireless audio device, and determining whether the throughput matches the current wireless transmission quality; and adjusting the first coding rate according to the determination result, further adjusting the sound quality of the audio data. In the method for adjusting sound quality, the host terminal, by determining whether the throughput during the transmission of the audio data fed back by the wireless audio device matches the current wireless transmission quality, adjusts the first coding rate that is predetermined according to the coding rate range of the wireless audio device and the current signal of the wireless transmission, and further adjusts the sound quality of the audio data played on the wireless audio device, which avoids unsmooth playback under a poor condition of wireless transmission quality, thereby improving the smoothness of the playback of the audio data on the wireless audio device.

BRIEF DESCRIPTION OF THE DRAWINGS

In order to illustrate the technical solution in the embodiments of the present disclosure or the prior art more clearly, brief description would be made below to the drawings required in the embodiments of the present disclosure or the prior art. Obviously, the drawings in the following description are merely some of the embodiments of the present disclosure, and those skilled in the art could obtain other drawings according to the structures shown in the drawings without any creative efforts.

The realizing of the aim, functional characteristics and advantages of the present disclosure are further described in detail with reference to the accompanying drawings and the embodiments.

DETAILED DESCRIPTION OF THE EMBODIMENTS

It will be appreciated that the specific embodiments described herein are merely illustrative of the present disclosure and are not intended to limit the present disclosure.

The present disclosure provides a method for adjusting sound quality, which is performed based on the quality of the wireless transmission between the host terminal and the wireless audio device.

Figure 1:
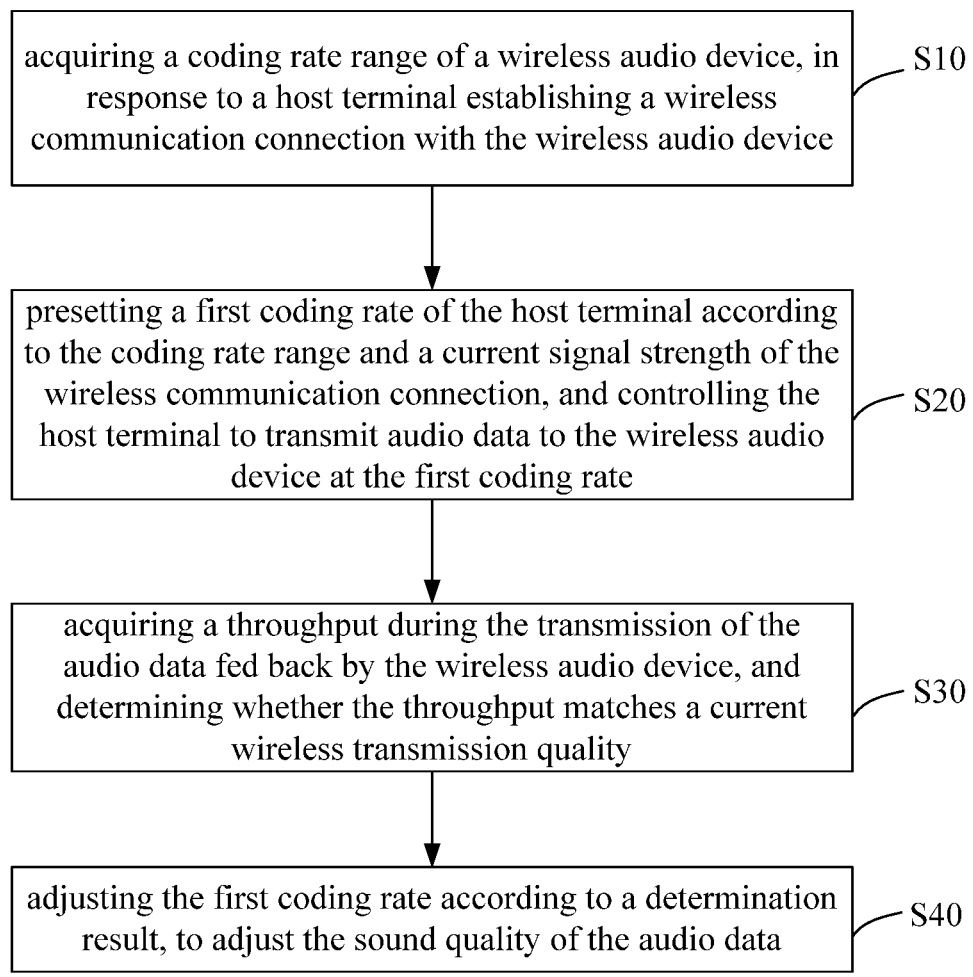
FIG. 1 is a flowchart diagram illustrating an embodiment of a method for adjusting sound quality according to the present disclosure.

Referring to FIG. 1, FIG. 1 is a flowchart diagram illustrating an embodiment of a sound quality adjusting method according to the present disclosure.

In this embodiment, the method for adjusting sound quality includes:

S10, acquiring a coding rate range of a wireless audio device, in response to a host terminal establishing a wireless communication connection with the wireless audio device;

S20, presetting a first coding rate of the host terminal according to the coding rate range and a current signal strength of the wireless communication connection, and controlling the host terminal to transmit audio data to the wireless audio device at the first coding rate;

S30, acquiring a throughput during the transmission of the audio data fed back by the wireless audio device, and determining whether the throughput matches a current wireless transmission quality; and S40, adjusting the first coding rate according to a determination result, to adjust the sound quality of the audio data.

The method for adjusting sound quality provided in this embodiment is mainly used to improve playing quality of the data during the wireless transmission, such as the wireless transmission between the host terminal and the wireless audio device in this embodiment. The host terminal may be a PC terminal, a server terminal, or a cloud; and the wireless audio device may be a Bluetooth headset, a Bluetooth speaker, or a multimedia device with Bluetooth function, or may also be a smart phone, a PC terminal, a smart watch using WiFi as data transmission standard, or a multimedia device with an audio playing function. The coding rate range of the wireless audio device is obtained when the host terminal establishes a wireless communication connection with the wireless audio device. The wireless communication connection may be Bluetooth connection, WiFi connection and ZigBee connection. The coding rate range of the wireless audio device is obtained, in response to that the host terminal and the wireless audio device are connected. The coding rate range of the wireless audio device is determined by a codec in the wireless audio device. During the data transmission process, the host terminal compresses or codes the digital signal to be transmitted by the codec, samples the digital signal, and limits data flow transmitted in a unit time by setting the sampling rate. Similarly, the codec of the wireless audio device converts the received digital signal into analog signal for output, whereby to generate sound. The coding rate range of the wireless audio device refers to how much flow of the audio data the wireless audio device can synchronously convert to sound analog signal, so as to avoid jamming when the audio data is played back, thereby improving the smoothness of audio playing.

After the wireless communication connection between the host terminal and the wireless audio device is established, the host terminal can transmit the audio data to the wireless audio device through the data transmission channel established therebetween. The transmission of the audio data depends on the coding rate of the data transmission terminal, and the coding rate is related to the sampling rate, the sampling bit number and the channel number of the wireless audio device. Thus, when adjusting the sound quality of the audio playing based on the wireless transmission quality, it is necessary to preset the first coding rate at which the host terminal transmits the audio data to the wireless audio device. In order to ensure the smoothness of the synchronous playing, the setting of the first coding rate also needs to consider the coding rate range of the wireless audio device; that is, the first coding rate of the host terminal is preset according to the coding rate range of the wireless audio device and the current signal strength of the wireless communication connection, and then the host terminal can be controlled to transmit the audio data to the wireless audio device at the first coding rate.

In the synchronous playing process of the wireless audio device based on the wireless transmission, the throughput during the transmission of the audio data fed back by the wireless audio device needs to be obtained at any time, so as to determine whether the throughput of the current audio data transmission matches the current wireless transmission quality at any time, namely detecting whether the audio data may be played unsmoothly on the wireless audio device; or to determine whether the occupation of the data transmission channel between the host terminal and the wireless audio device is low, which causes waste of network resources. Finally, the first coding rate at which the host terminal transmits the audio data to the wireless audio device is adjusted, according to the determination result that whether the throughput of audio data transmission fed back by the wireless audio device matches the current wireless transmission quality, so as to adjust the playing sound quality of the audio data, thereby improving the playing quality of the wireless audio device.

In accordance with the present disclosure, the method for adjusting sound quality is performed based on the quality of the wireless transmission between the host terminal and the wireless audio device. The method includes: acquiring a coding rate range of a wireless audio device, in response to a host terminal establishing a wireless communication connection with the wireless audio device; presetting a first coding rate of the host terminal according to the coding rate range and a current signal strength of the wireless communication connection, and controlling the host terminal to transmit audio data to the wireless audio device at the first coding rate; acquiring a throughput during the transmission of the audio data fed back by the wireless audio device, and determining whether the throughput matches a current wireless transmission quality; and adjusting the first coding rate according to a determination result, to adjust the sound quality of the audio data. In the method for adjusting sound quality, the host terminal, by determining whether the throughput during the transmission of the audio data fed back by the wireless audio device matches the current wireless transmission quality, adjusts the first coding rate that is predetermined according to the coding rate range of the wireless audio device and the current signal of the wireless transmission, and further adjusts the sound quality of the audio data played on the wireless audio device, which avoids unsmooth playback under a poor condition of wireless transmission quality, thereby improving the smoothness of the playback of the audio data on the wireless audio device.

Figure 2:
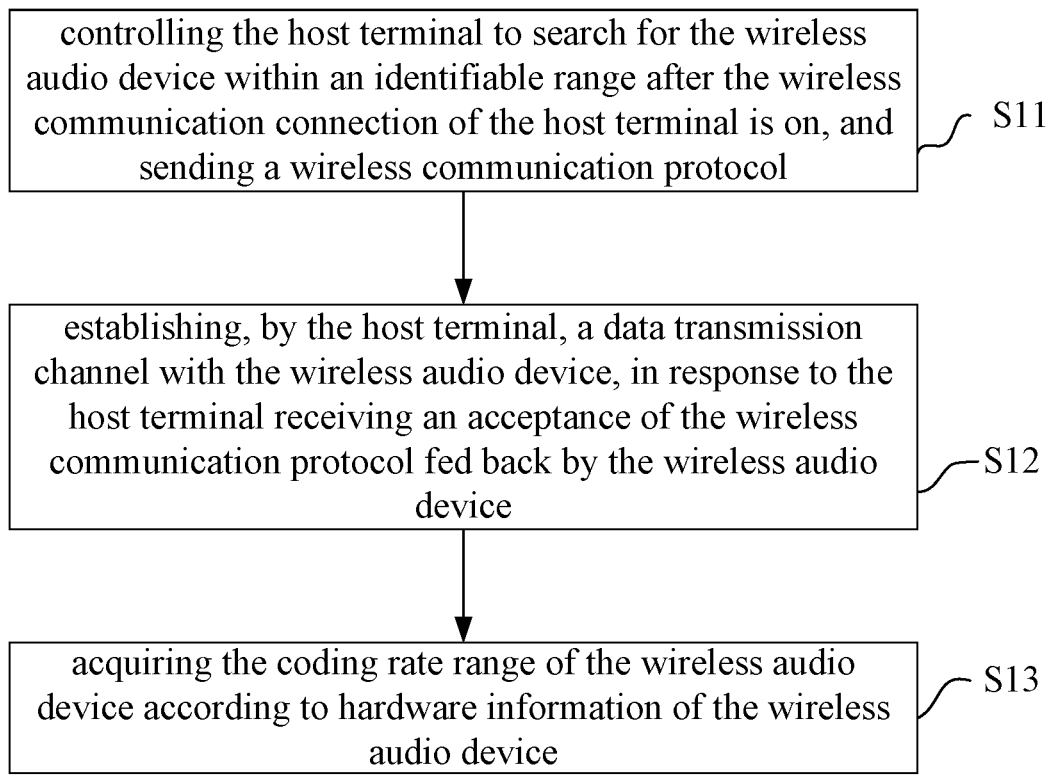
FIG. 2 is a detailed flowchart diagram illustrating step S10 in the embodiment shown in FIG. 1.

Referring to FIG. 2, step S10 in the above embodiments of the method for adjusting sound quality further includes:

S11, controlling the host terminal to search for the wireless audio device within an identifiable range after the wireless communication connection of the host terminal is on, and sending a wireless communication protocol to the wireless audio device;

S12, establishing, by the host terminal, a data transmission channel with the wireless audio device, in response to the host terminal receiving an acceptance of the wireless communication protocol fed back by the wireless audio device; and S13, acquiring the coding rate range of the wireless audio device according to hardware information of the wireless audio device.

In this embodiment, the host terminal and the wireless audio device are connected by using a wireless communication protocol, such as Bluetooth, WiFi, and Zigbee. Taking the Bluetooth as an example, after the Bluetooth function of the host terminal is turned on, the host terminal is controlled to search for all wireless audio devices within an identifiable range, where the identifiable range, according to the Bluetooth communication standard, is generally a range within 6 to 10 meters around the host terminal. That is, after the Bluetooth function of the host terminal is turned on, the host terminal is controlled to search for all the wireless audio devices that also have the Bluetooth function turned on within the range of 6 to 10 meters around. In another embodiments, after the Bluetooth function of the host terminal is turned on, the host terminal may automatically search for all the wireless audio devices within the identifiable range. After the wireless audio device is searched, the host terminal sends the wireless communication protocol to the wireless audio device, and the wireless audio device may accept the wireless communication protocol or reject the wireless communication protocol according to a preset program. The host terminal receives a connection success message fed back by the wireless audio device if the wireless communication protocol is accepted by the wireless audio device, and establishes a data transmission channel with the wireless audio device. The host terminal receives a connection failure message fed back by the wireless audio device if the wireless communication protocol is rejected by the wireless audio device. In this case, the Bluetooth function of the host terminal can be controlled to restart, or the connection can be re-attempted after another searching until the connection is successful. The host terminal acquires hardware information of the wireless audio device in response to the host terminal establishing the data transmission channel with the wireless audio device, mainly including data information of a codec of the wireless audio device, and then acquires the coding rate range of the wireless audio device according to the data information of the codec.

Figure 3:
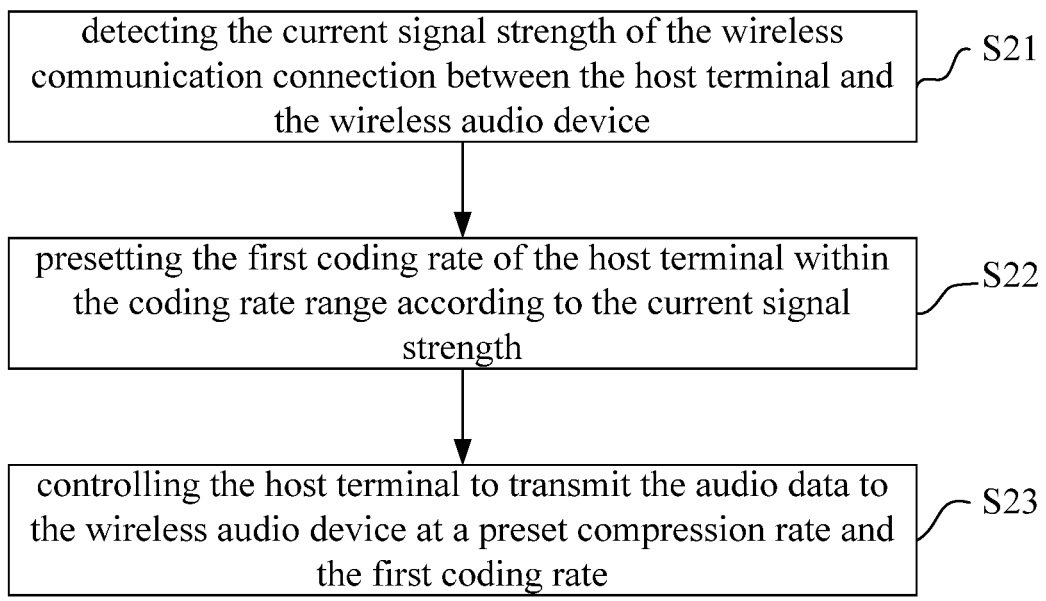
FIG. 3 is a detailed flowchart diagram illustrating step S20 in the embodiment shown in FIG. 1.

Referring to FIG. 3, step S20 in the above embodiments of the method for adjusting sound quality further includes:

S21, detecting the current signal strength of the wireless communication connection between the host terminal and the wireless audio device;

S22, presetting the first coding rate of the host terminal within the coding rate range according to the current signal strength; and S23, controlling the host terminal to transmit the audio data to the wireless audio device at a preset compression rate and the first coding rate.

In this embodiment, before the host terminal transmits the audio data to the wireless audio device, the host terminal needs to be set with the first coding rate, which is used as a basis for obtaining the coding rate at which the host terminal transmits the audio data to the wireless audio device according to the wireless transmission quality. First, the current signal strength of the wireless communication connection between the host terminal and the wireless audio device is detected, so that the first coding rate of the host terminal can be set with reference to the current signal strength. Then, the first coding rate of the host terminal is set according to the current signal strength and the coding rate range of the wireless audio device. The coding rate range of the wireless audio device indicates the maximum rate that the codec of the wireless audio device can decode in a unit time. Thus, it should comprehensively consider the signal strength of the current wireless transmission and the coding rate range of the wireless audio device when setting the first coding rate of the host terminal, thereby to ensure the audio data to be played smoothly on the wireless audio device. For example, the first coding rate may be set to 48k*16 bit*2 bps. Finally, the host terminal is controlled to transmit the audio data to the wireless audio device at the preset compression rate and the first coding rate, so as to realize the smooth playback of the audio data.

Figure 4:
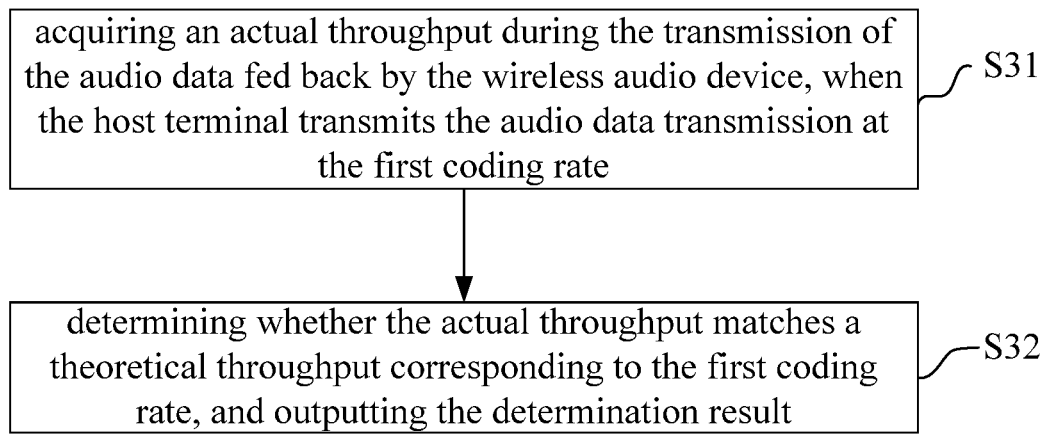
FIG. 4 is a detailed flowchart diagram illustrating step S30 in the embodiment shown in FIG. 1.

Referring to FIG. 4, step S30 in the above embodiments of the method for adjusting sound quality further includes:

S31, acquiring an actual throughput during the transmission of the audio data fed back by the wireless audio device, when the host terminal transmits the audio data transmission at the first coding rate; and S32, determining whether the actual throughput matches a theoretical throughput corresponding to the first coding rate, and outputting the determination result.

In this embodiment, determining whether the current wireless transmission quality satisfies the requirement of the audio data transmission is implemented by acquiring the actual throughput when the host terminal transmits the audio data at the first coding rate. The actual throughput is the actual size of the audio data received by the wireless audio device in a unit time. Taking the first coding rate 48k*16 bit*2 bps in the above embodiments as an example, the theoretical throughput corresponding to the first coding rate in a unit time is 1536 kb. Accordingly, when determining whether the actual throughput during the transmission of the audio data fed back by the wireless audio device matches the theoretical throughput corresponding to the first coding rate, it only needs to compare the actual throughput at the current moment with the theoretical throughput 1536 kb. In some embodiments, the theoretical throughput may be set to a threshold range, for a more accurate adjustment of the first coding rate. The determination result that whether the actual throughput matches the theoretical throughput can be obtained, as long as the actual throughput is within the threshold range of the theoretical throughput.

Figure 5:
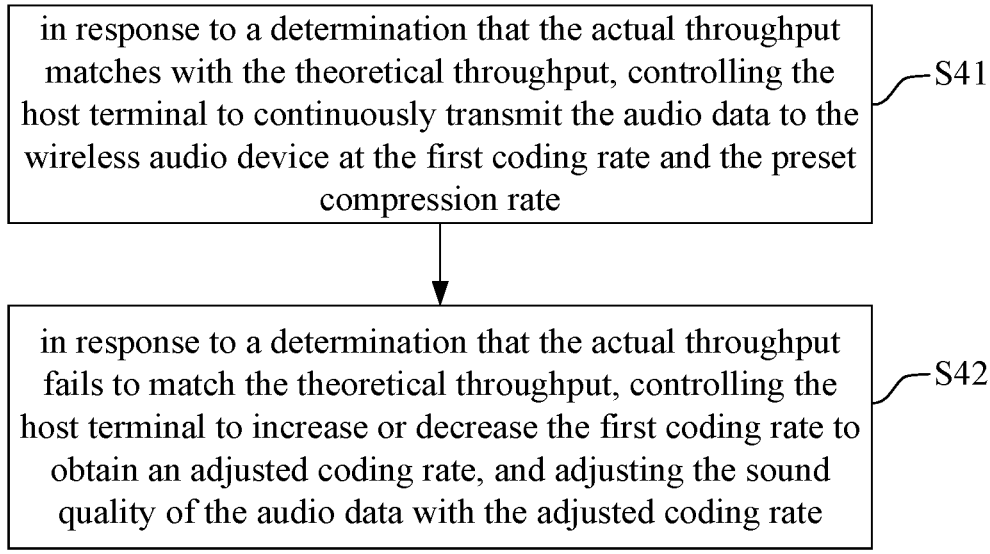
FIG. 5 is a detailed flowchart diagram illustrating step S40 in the embodiment shown in FIG. 1.

Referring to FIG. 5, step S40 in the above embodiments of the method for adjusting sound quality further includes:

S41, in response to a determination that the actual throughput matches the theoretical throughput, controlling the host terminal to continuously transmit the audio data to the wireless audio device at the first coding rate and the preset compression rate; and S42, in response to a determination that the actual throughput fails to match the theoretical throughput, controlling the host terminal to increase or decrease the first coding rate to obtain an adjusted coding rate, and adjusting the sound quality of the audio data with the adjusted coding rate.

In this embodiment, adjusting the first coding rate and the sound quality of the audio data according to the determination result can be realized as follows. On condition that the actual throughput matches the theoretical throughput, namely the actual throughput is within the threshold range of the theoretical throughput, the current wireless transmission quality can enable the smooth playback of the audio data, and in this case, the host terminal is controlled to continuously transmit the audio data to the wireless audio device at the first coding rate and the preset compression rate, where the preset compression rate may be set according to the load of the data transmission channel. On condition that the actual throughput does not match the theoretical throughput, namely the actual throughput is not within the threshold range of the theoretical throughput, the current wireless transmission quality cannot enable the smooth playback of the audio data, and in this case, the host terminal is controlled to reduce the first coding rate to obtain an adjusted coding rate, so as to reduce the sound quality of the audio data with the adjusted coding rate; or the load of the current data transmission channel far exceeds the load required for the smooth playback, the host terminal is controlled to increase the first coding rate to obtain an adjusted coding rate, so as to improve the sound quality of the audio data with the adjusted coding rate, which also improves utilization rate of the network resources.

Figure 6:
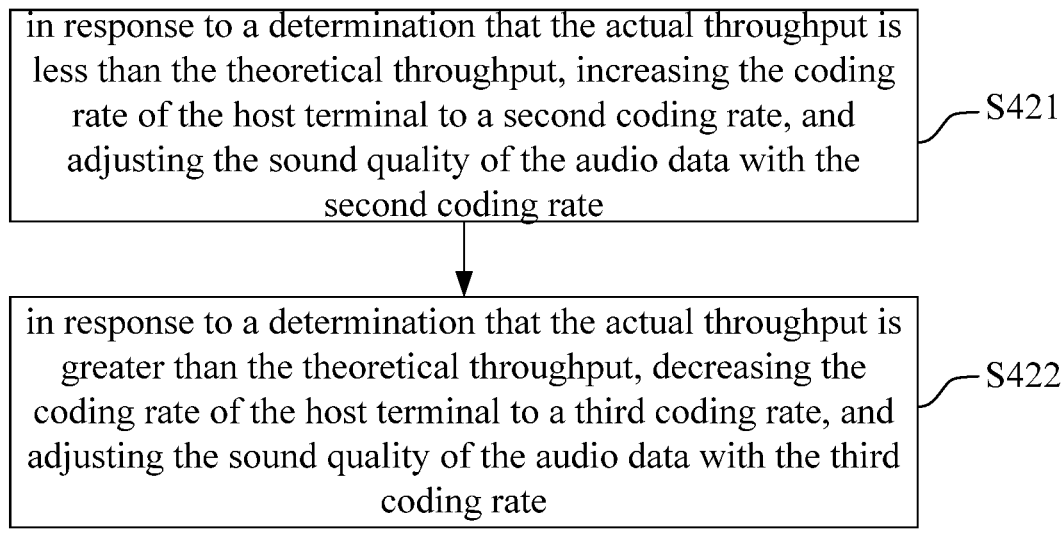
FIG. 6 is a detailed flowchart diagram illustrating step S42 in the embodiment shown in FIG. 5.

Referring to FIG. 6, step S42 in the above embodiments of the method for adjusting sound quality further includes:

S421, in response to a determination that the actual throughput is less than the theoretical throughput, increasing the coding rate of the host terminal to a second coding rate, and adjusting the sound quality of the audio data with the second coding rate; and S422, in response to a determination that the actual throughput is greater than the theoretical throughput, decreasing the coding rate of the host terminal to a third coding rate, and adjusting the sound quality of the audio data with the third coding rate.

In this embodiment, when the actual throughput during the transmission of the audio data fed back by the wireless audio device does not match the theoretical throughput corresponding to the first coding rate, the specific operation is as follows. The condition of the actual throughput being less than the theoretical throughput indicates that the current wireless transmission quality can support a traffic load of a higher coding rate; that is, the current wireless transmission quality can enable the wireless audio device to play the received audio data with higher sound quality, and accordingly the coding rate of the host terminal can be increased to a second coding rate that is greater than the first coding rate, so as to automatically improve the playing sound quality of the wireless audio device, thereby providing users with more realistic sound. The condition of the actual throughput being greater than the theoretical throughput indicates that the current wireless transmission quality cannot support the traffic load of the first coding rate; that is, the current wireless transmission quality can only enable the wireless audio device to play the received audio data with lower sound quality, and accordingly the coding rate of the host terminal should be reduced to the third coding rate that is less than the first coding rate, so as to automatically reduce the playing sound quality of the wireless audio device. However, in this case, users can still be provided with a relatively smoother audio playback.

The present disclosure also provides a host terminal, including a memory, a processor and a program for adjusting sound quality stored in the memory and executable by the processor. The program for adjusting sound quality when being executed by the processor performs the following operations:

acquiring a coding rate range of a wireless audio device, in response to a host terminal establishing a wireless communication connection with the wireless audio device;

presetting a first coding rate of the host terminal according to the coding rate range and a current signal strength of the wireless communication connection, and controlling the host terminal to transmit audio data to the wireless audio device at the first coding rate;

acquiring a throughput during the transmission of the audio data fed back by the wireless audio device, and determining whether the throughput matches a current wireless transmission quality; and adjusting the first coding rate according to a determination result, to adjust the sound quality of the audio data.

In this embodiment, the host terminal, by determining whether the throughput during the transmission of the audio data fed back by the wireless audio device matches the current wireless transmission quality, adjusts the first coding rate that is predetermined according to the coding rate range of the wireless audio device and the current signal of the wireless transmission, and further adjusts the sound quality of the audio data played on the wireless audio device, which avoids unsmooth playback under a poor condition of wireless transmission quality, thereby improving the smoothness of the playback of the audio data on the wireless audio device.

In some embodiments, the program for adjusting sound quality when being executed by the processor performs the following operations:

controlling the host terminal to search for the wireless audio device within an identifiable range after the wireless communication connection of the host terminal is on, and sending a wireless communication protocol;

establishing, by the host terminal, a data transmission channel with the wireless audio device, in response to the host terminal receiving an acceptance of the wireless communication protocol fed back by the wireless audio device; and acquiring the coding rate range of the wireless audio device according to hardware information of the wireless audio device.

In some embodiments, the program for adjusting sound quality when being executed by the processor performs the following operations:

detecting the current signal strength of the wireless communication connection between the host terminal and the wireless audio device;

presetting the first coding rate of the host terminal within the coding rate range according to the current signal strength; and controlling the host terminal to transmit the audio data to the wireless audio device at a preset compression rate and the first coding rate.

In some embodiments, the program for adjusting sound quality when being executed by the processor performs the following operations:

acquiring an actual throughput during the transmission of the audio data fed back by the wireless audio device, when the host terminal transmits the audio data transmission at the first coding rate; and determining whether the actual throughput matches a theoretical throughput corresponding to the first coding rate, and outputting the determination result.

In some embodiments, the program for adjusting sound quality when being executed by the processor performs the following operations:

in response to a determination that the actual throughput matches the theoretical throughput, controlling the host terminal to continuously transmit the audio data to the wireless audio device at the first coding rate and the preset compression rate; and in response to a determination that the actual throughput fails to match the theoretical throughput, controlling the host terminal to increase or decrease the first coding rate to obtain an adjusted coding rate, and adjusting the sound quality of the audio data with the adjusted coding rate.

In some embodiments, the program for adjusting sound quality when being executed by the processor performs the following operations:

in response to a determination that the actual throughput is less than the theoretical throughput, increasing the coding rate of the host terminal to a second coding rate, and improving the sound quality of the audio data with the second coding rate; and in response to a determination that the actual throughput is greater than the theoretical throughput, decreasing the coding rate of the host terminal to a third coding rate, and reducing the sound quality of the audio data with the third coding rate.

In some embodiments, the wireless communication connection includes a Bluetooth connection, a WiFi connection, or a ZigBee connection. The wireless audio device includes a Bluetooth earphone, a Bluetooth speaker, or a mobile phone.

The present disclosure also provides a system for adjusting sound quality, including a host terminal as described above, and a wireless audio device configured to receive and play the audio data transmitted by the host terminal.

In this embodiment, the system for adjusting sound quality includes the host terminal described above and the wireless audio device configured to receive and play the audio data transmitted by the host terminal. In operation, the host terminal, by determining whether the throughput during the transmission of the audio data fed back by the wireless audio device matches the current wireless transmission quality, adjusts the first coding rate that is predetermined according to the coding rate range of the wireless audio device and the current signal of the wireless transmission, and further adjusts the sound quality of the audio data played on the wireless audio device, which avoids unsmooth playback of the audio data under a poor condition of wireless transmission quality, thereby improving the smoothness of the playback of the audio data on the wireless audio device.

The present disclosure also provides a storage medium, storing a program for adjusting sound quality. The program for adjusting sound quality when being executed by a processor performs the steps of the method for adjusting sound quality as described above.

The technical solutions realized when executing the program for adjusting sound quality can refer to the embodiments of the method for adjusting sound quality in the present disclosure, which are not detailed herein.

It's to be clarified that the term "include", "comprise" or any other variants thereof is intended to encompass a non-exclusive inclusion, such that a process, method, device, or system including a series of elements not only includes those elements, but also includes other elements that are not explicitly listed, or elements that are inherent to such a process, method, device, or system. In the absence of more restrictions, an element defined by the phrase "including one . . . " does not exclude the existence of additional identical elements in the process, method, device, or system that includes the element.

The numbers of the embodiments according to the present disclosure are merely for description, and do not represent for the advantages and disadvantages of the embodiments.

According to the description of the above-mentioned embodiments, the skilled in the art can clearly understand that the method of embodiments above may be implemented by means of software plus a necessary general hardware platform, of course, also by means of hardware, but in many cases the former is a better implementation. Based on the understanding, the technical solution of the present disclosure can be embodied in the form of a software product in essence or in part contributing to the prior art. The software product is stored in a storage medium (such as a ROM/RAM, a magnetic disk, an optical disk) as described above, including a plurality of instructions for causing a host terminal device (which may be a mobile phone, a computer, a server, an air conditioner, or a network device, and so on.) to execute the method described in various embodiments according to the present disclosure.

The foregoing description merely portrays some illustrative embodiments in accordance with the disclosure and therefore is not intended to limit the patentable scope of the disclosure. Any equivalent structure or flow transformations that are made taking advantage of the specification and accompanying drawings of the disclosure and any direct or indirect applications thereof in other related technical fields shall all fall in the scope of protection of the disclosure.

What is claimed is:

1. A method for adjusting sound quality, comprising:
   acquiring by a host terminal a range of coding rates of a wireless audio device, in response to the host terminal establishing a wireless communication connection directly with the wireless audio device on a license-free frequency band at least for wireless personal area networking within an identifiable range, wherein the host terminal is capable of establishing the wireless communication connection directly with the wireless audio device that is searchable by the host terminal in the identifiable range using the wireless personal area networking on the license-free frequency band;
   presetting a first coding rate of the host terminal according to the range of coding rates and a current signal strength of the wireless communication connection, and controlling the host terminal to transmit audio data to the wireless audio device at the first coding rate;
   acquiring a throughput during the transmission of the audio data fed back by the wireless audio device, and determining whether the throughput matches a current wireless transmission quality; and
   adjusting the first coding rate according to a determination result, to adjust the sound quality of the audio data.

2. The method according to claim 1, wherein the operation of acquiring a range of coding rates of a wireless audio device, in response to a host terminal establishing a wireless communication connection directly with the wireless audio device comprises:
   controlling the host terminal to search for the wireless audio device within an identifiable range after the wireless communication connection of the host terminal is on, and sending a wireless communication protocol;
   establishing, by the host terminal, a data transmission channel with the wireless audio device on the license-free frequency band at least for wireless personal area networking within the identifiable range, in response to the host terminal receiving an acceptance of the wireless communication protocol fed back by the wireless audio device; and
   acquiring the range of coding rates of the wireless audio device according to hardware information of the wireless audio device.

3. The method according to claim 1, wherein the operation of presetting a first coding rate of the host terminal according to the range of coding rates and a current signal strength of the wireless communication connection, and controlling the host terminal to transmit audio data to the wireless audio device at the first coding rate comprises:
   detecting the current signal strength of the wireless communication connection between the host terminal and the wireless audio device;
   presetting the first coding rate of the host terminal within the range of coding rates according to the current signal strength; and
   controlling the host terminal to transmit the audio data to the wireless audio device at a preset compression rate and the first coding rate.

4. The method according to claim 2, wherein the operation of presetting a first coding rate of the host terminal according to the range of coding rates and a current signal strength of the wireless communication connection, and controlling the host terminal to transmit audio data to the wireless audio device at the first coding rate comprises:
   detecting the current signal strength of the wireless communication connection between the host terminal and the wireless audio device;
   presetting the first coding rate of the host terminal within the range of coding rates according to the current signal strength; and
   controlling the host terminal to transmit the audio data to the wireless audio device at a preset compression rate and the first coding rate.

5. The method according to claim 1, wherein the operation of acquiring a throughput during the transmission of the audio data fed back by the wireless audio device, and determining whether the throughput matches a current wireless transmission quality comprises:
   acquiring an actual throughput during the transmission of the audio data fed back by the wireless audio device, when the host terminal transmits the audio data transmission at the first coding rate; and
   determining whether the actual throughput matches a theoretical throughput corresponding to the first coding rate, and outputting the determination result.

6. The method according to claim 5, wherein the operation of adjusting the first coding rate according to a determination result, to adjust the sound quality of the audio data comprises:
   controlling the host terminal to continuously transmit the audio data to the wireless audio device at the first coding rate and the preset compression rate, on condition that the actual throughput matches with the theoretical throughput; and
   controlling the host terminal to increase or decrease the first coding rate to obtain an adjusted coding rate, on condition that the actual throughput fails to match the theoretical throughput, and adjusting the sound quality of the audio data with the adjusted coding rate.

7. The method according to claim 6, wherein the operation of controlling the host terminal to increase or decrease the first coding rate to obtain an adjusted coding rate, on condition that the actual throughput fails to match the theoretical throughput, and adjusting the sound quality of the audio data with the adjusted coding rate comprises:
   increasing the coding rate of the host terminal to a second coding rate, on condition that the actual throughput is less than the theoretical throughput, and improving the sound quality of the audio data with the second coding rate; and
   decreasing the coding rate of the host terminal to a third coding rate, on condition that the actual throughput is greater than the theoretical throughput, and reducing the sound quality of the audio data with the third coding rate.

8. The method according to claim 1, wherein the wireless communication connection comprises a Bluetooth connection, a WiFi connection, or a ZigBee connection; the wireless audio device comprises a Bluetooth earphone, a Bluetooth speaker, or a mobile phone.

9. A host terminal, comprising a memory, a processor and a program for adjusting sound quality stored in the memory and executable by the processor, wherein the program for adjusting sound quality when being executed by the processor performs the following operations:

acquiring a range of coding rates of a wireless audio device, in response to the host terminal establishing a wireless communication connection directly with the wireless audio device on a license-free frequency band at least for wireless personal area networking within an identifiable range, wherein the host terminal is capable of establishing the wireless communication connection directly with the wireless audio device that is searchable by the host terminal in the identifiable range using the wireless personal area networking on the license-free frequency band;

presetting a first coding rate of the host terminal according to the range of coding rates and a current signal strength of the wireless communication connection, and controlling the host terminal to transmit audio data to the wireless audio device at the first coding rate;

acquiring a throughput during the transmission of the audio data fed back by the wireless audio device, and determining whether the throughput matches a current wireless transmission quality; and adjusting the first coding rate according to a determination result, to adjust the sound quality of the audio data.

10. The host terminal according to claim 9, wherein the program for adjusting sound quality when being executed by the processor performs the following operations:

controlling the host terminal to search for the wireless audio device within an identifiable range after the wireless communication connection of the host terminal is on, and sending a wireless communication protocol;

establishing, by the host terminal, a data transmission channel with the wireless audio device on the license-free frequency band at least for wireless personal area networking within the identifiable range, in response to the host terminal receiving an acceptance of the wireless communication protocol fed back by the wireless audio device; and acquiring the range of coding rates of the wireless audio device according to hardware information of the wireless audio device.

11. The host terminal according to claim 9, wherein the program for adjusting sound quality when being executed by the processor performs the following operations:

detecting the current signal strength of the wireless communication connection between the host terminal and the wireless audio device;

presetting the first coding rate of the host terminal within the range of coding rates according to the current signal strength; and controlling the host terminal to transmit the audio data to the wireless audio device at a preset compression rate and the first coding rate.

12. The host terminal according to claim 9, wherein the program for adjusting sound quality when being executed by the processor performs the following operations:

acquiring an actual throughput during the transmission of the audio data fed back by the wireless audio device, when the host terminal transmits the audio data transmission at the first coding rate; and determining whether the actual throughput matches a theoretical throughput corresponding to the first coding rate, and outputting the determination result.

13. The host terminal according to claim 12, wherein the program for adjusting sound quality when being executed by the processor performs the following operations:

controlling the host terminal to continuously transmit the audio data to the wireless audio device at the first coding rate and the preset compression rate, on condition that the actual throughput matches with the theoretical throughput; and controlling the host terminal to increase or decrease the first coding rate to obtain an adjusted coding rate, on condition that the actual throughput fails to match the theoretical throughput, and adjusting the sound quality of the audio data with the adjusted coding rate.

14. The host terminal according to claim 13, wherein the program for adjusting sound quality when being executed by the processor performs the following operations:

increasing the coding rate of the host terminal to a second coding rate, on condition that the actual throughput is less than the theoretical throughput, and improving the sound quality of the audio data with the second coding rate; and decreasing the coding rate of the host terminal to a third coding rate, on condition that the actual throughput is greater than the theoretical throughput, and reducing the sound quality of the audio data with the third coding rate.

15. The host terminal according to claim 9, wherein the wireless communication connection includes a Bluetooth connection, a WiFi connection, or a ZigBee connection; the wireless audio device includes a Bluetooth earphone, a Bluetooth speaker, or a mobile phone.

16. A system for adjusting sound quality, comprising:

a host terminal, comprising a memory, a processor and a program for adjusting sound quality stored in the memory and executable by the processor, wherein the program for adjusting sound quality when being executed by the processor performs the following operations:

acquiring by a host terminal a range of coding rates of a wireless audio device, in response to the host terminal establishing a wireless communication connection directly with the wireless audio device on a license-free frequency band at least for wireless personal area networking within an identifiable range, wherein the host terminal is capable of establishing the wireless communication connection directly with the wireless audio device that is searchable by the host terminal in the identifiable range using the wireless personal area networking on the license-free frequency band;

presetting a first coding rate of the host terminal according to the range of coding rates and a current signal strength of the wireless communication connection, and controlling the host terminal to transmit audio data to the wireless audio device at the first coding rate; acquiring a throughput during the transmission of the audio data fed back by the wireless audio device, and determining whether the throughput matches a current wireless transmission quality; and adjusting the first coding rate according to a determination result, to adjust the sound quality of the audio data; and a wireless audio device, configured to receive and play the audio data transmitted by the host terminal.

17. The system according to claim 16, wherein the program for adjusting sound quality when being executed by the processor performs the following operations:

controlling the host terminal to search for the wireless audio device within an identifiable range after the wireless communication connection of the host terminal is on, and sending a wireless communication protocol;

establishing, by the host terminal, a data transmission channel with the wireless audio device on the license-free frequency band at least for wireless personal area networking within the identifiable range, in response to the host terminal receiving an acceptance of the wireless communication protocol fed back by the wireless audio device; and acquiring the range of coding rates of the wireless audio device according to hardware information of the wireless audio device.

18. The system according to claim 16, wherein the program for adjusting sound quality when being executed by the processor performs the following operations:

detecting the current signal strength of the wireless communication connection between the host terminal and the wireless audio device;

presetting the first coding rate of the host terminal within the range of coding rates according to the current signal strength; and controlling the host terminal to transmit the audio data to the wireless audio device at a preset compression rate and the first coding rate.

19. The system according to claim 16, wherein the program for adjusting sound quality when being executed by the processor performs the following operations:

acquiring an actual throughput during the transmission of the audio data fed back by the wireless audio device, when the host terminal transmits the audio data transmission at the first coding rate; and determining whether the actual throughput matches a theoretical throughput corresponding to the first coding rate, and outputting the determination result.

20. The system according to claim 19, wherein the program for adjusting sound quality when being executed by the processor performs the following operations:

controlling the host terminal to continuously transmit the audio data to the wireless audio device at the first coding rate and the preset compression rate, on condition that the actual throughput matches with the theoretical throughput; and controlling the host terminal to increase or decrease the first coding rate to obtain an adjusted coding rate, on condition that the actual throughput fails to match the theoretical throughput, and adjusting the sound quality of the audio data with the adjusted coding rate.

* * * * *